(12) United States Patent
Hecht et al.

(10) Patent No.: US 9,242,353 B2
(45) Date of Patent: Jan. 26, 2016

(54) HAND-HELD MACHINE TOOL HAVING AUTOMATIC SHAFT LOCKING

(75) Inventors: Joachim Hecht, Magstadt (DE); Heiko Roehm, Stuttgart (DE); Martin Kraus, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1119 days.

(21) Appl. No.: 12/998,241

(22) PCT Filed: Sep. 4, 2009

(86) PCT No.: PCT/EP2009/061443
§ 371 (c)(1),
(2), (4) Date: May 26, 2011

(87) PCT Pub. No.: WO2010/043449
PCT Pub. Date: Apr. 22, 2010

(65) Prior Publication Data
US 2011/0214892 A1 Sep. 8, 2011

(30) Foreign Application Priority Data

Oct. 14, 2008 (DE) .......................... 10 2008 042 812
Jul. 13, 2009 (DE) .......................... 10 2009 027 643

(51) Int. Cl.
| | | |
|---|---|---|
| *E21B 3/00* | (2006.01) | |
| *E21B 17/22* | (2006.01) | |
| *E21B 19/16* | (2006.01) | |
| *E21B 19/18* | (2006.01) | |
| *B25B 21/00* | (2006.01) | |
| *B25F 5/00* | (2006.01) | |
| *F16C 19/50* | (2006.01) | |
| *F16C 41/00* | (2006.01) | |
| *F16D 41/10* | (2006.01) | |

(52) U.S. Cl.
CPC .................. *B25B 21/00* (2013.01); *B25F 5/001* (2013.01); *F16C 19/50* (2013.01); *F16C 41/001* (2013.01); *F16D 41/105* (2013.01)

(58) Field of Classification Search
CPC .................................... B25F 5/001; B25F 5/00
USPC ......... 173/20, 29, 178, 48, 47, 216–217, 131, 173/132, 170–171
See application file for complete search history.

(56) References Cited

U.S. PATENT DOCUMENTS

| | | | |
|---|---|---|---|
| 1,982,886 A | 12/1934 | Swartz | |
| 4,653,338 A * | 3/1987 | Yeomans | .......................... 74/318 |
| 5,016,501 A | 5/1991 | Holzer, Jr. | |
| 6,270,085 B1 * | 8/2001 | Chen et al. | ....................... 279/22 |
| 6,325,393 B1 * | 12/2001 | Chen et al. | ....................... 279/22 |
| 6,349,948 B1 * | 2/2002 | Wu | ................................. 279/77 |
| 6,497,316 B1 * | 12/2002 | Hsu | .......................... B25B 21/00 |
| | | | 173/178 |

(Continued)

FOREIGN PATENT DOCUMENTS

| | | |
|---|---|---|
| CN | 2683290 | 3/2005 |
| CN | 200970762 | 11/2007 |

(Continued)

*Primary Examiner* — Robert Long
(74) *Attorney, Agent, or Firm* — Kenyon & Kenyon LLP

(57) ABSTRACT

A hand-held machine tool device, in particular, for a screwdriver (12*a-h*), having a locking device (14*a-h*) for locking a power take-off unit (16*a-h*), and having a rotational bearing device (18*a-h*) of the power take-off unit (16*a-h*). It is provided that at least part of the locking device (14*a-h*) and the rotational bearing device (18*a-h*) be formed in one piece.

14 Claims, 8 Drawing Sheets

(56) References Cited

U.S. PATENT DOCUMENTS

| | | | |
|---|---|---|---|
| 6,966,562 B1* | 11/2005 | Wienhold | 279/75 |
| 7,537,540 B2* | 5/2009 | Baumann et al. | 475/263 |
| 8,328,474 B2* | 12/2012 | Pangerc et al. | 408/204 |
| 2002/0101106 A1* | 8/2002 | Kim et al. | 297/362.11 |
| 2005/0108814 A1* | 5/2005 | Thompson | 4/252.6 |
| 2009/0065228 A1* | 3/2009 | Hashimoto et al. | 173/48 |
| 2009/0269155 A1* | 10/2009 | Wang | 408/211 |
| 2011/0030984 A1* | 2/2011 | Chen | B23B 45/008 173/47 |
| 2011/0214892 A1* | 9/2011 | Hecht | B25B 21/00 173/164 |
| 2012/0160535 A1* | 6/2012 | Ikuta | B25F 5/001 173/176 |
| 2013/0025901 A1* | 1/2013 | Shi | B25B 21/00 173/216 |

FOREIGN PATENT DOCUMENTS

| | | |
|---|---|---|
| DE | 197 50 262 | 5/1999 |
| DE | 199 16 295 | 10/2000 |
| DE | 19916295 A1 * | 10/2000 |
| EP | 1 955 818 | 8/2008 |
| JP | 2007-333069 | 12/2007 |
| JP | 2008-121848 | 5/2008 |
| WO | WO 0061961 A1 * | 10/2000 |
| WO | WO 2005/108814 | 11/2005 |

* cited by examiner

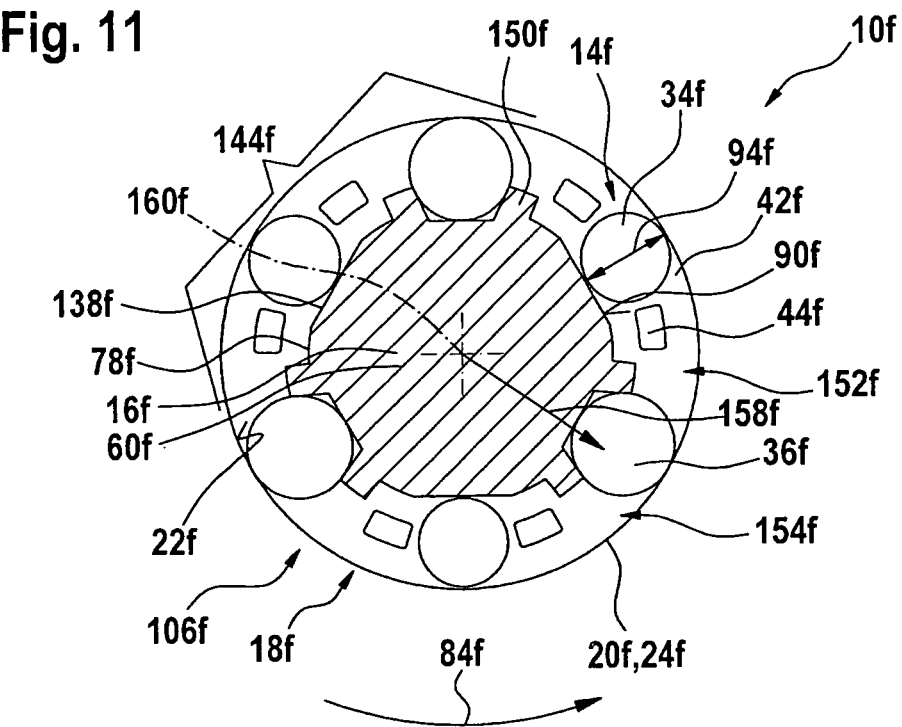
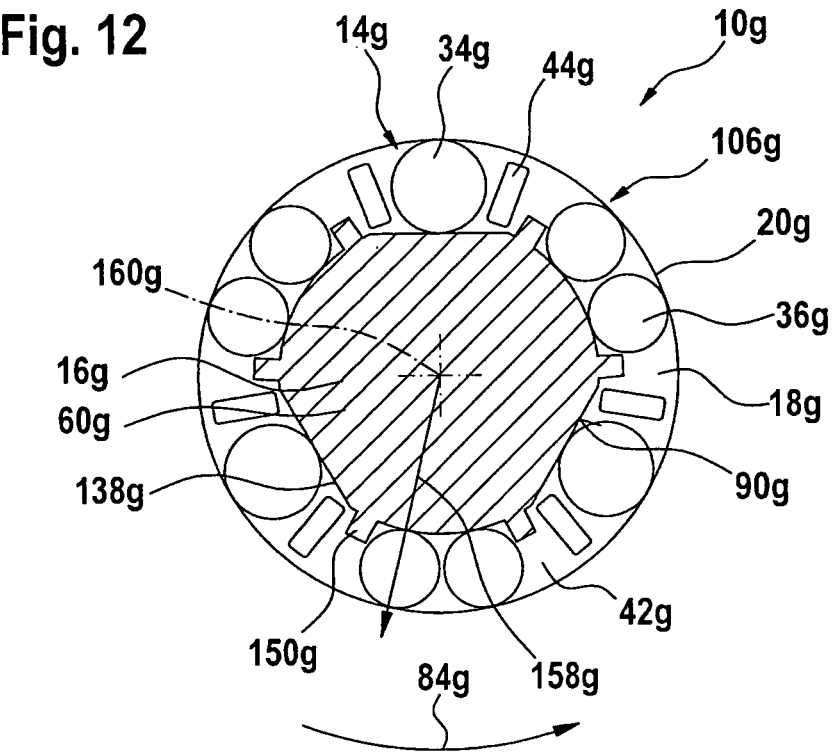

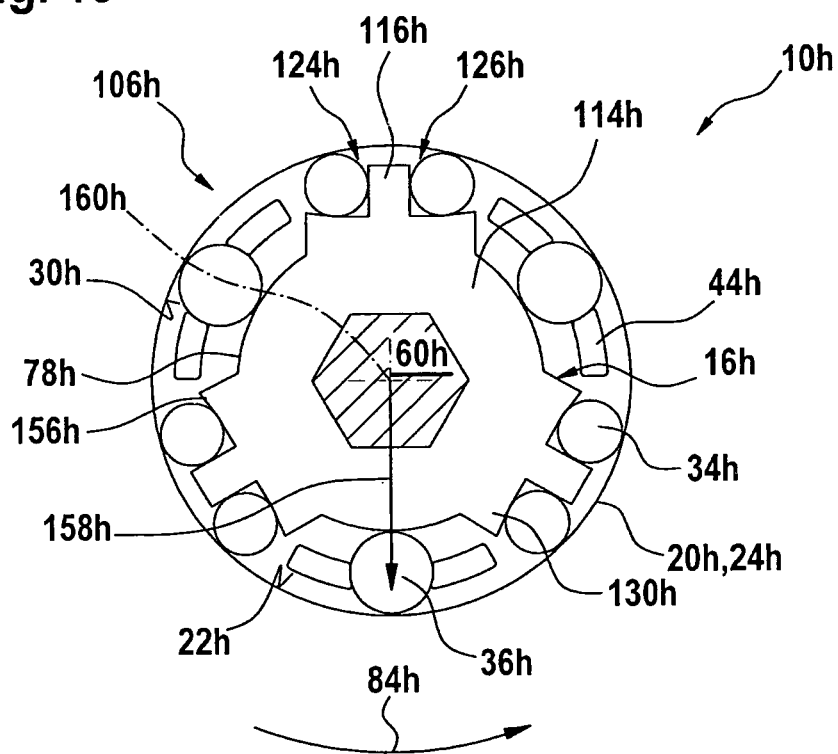

HAND-HELD MACHINE TOOL HAVING AUTOMATIC SHAFT LOCKING

BACKGROUND OF THE INVENTION

1. Field of the Invention

The present invention is based on a hand-held machine tool device, in particular for a screwdriver.

2. Description of Related Art

A hand-held machine tool device, particularly for a screwdriver, having a locking device for locking a power take-off unit, and having a rotational bearing device of the power take-off unit, has already been proposed.

SUMMARY OF THE INVENTION

The present invention is based on a hand-held machine tool device, in particular for a screwdriver, having a locking device for locking a power take-off unit, and having a rotational bearing device of the power take-off unit.

It is proposed that at least part of the locking device and the rotational bearing device be formed in one piece. In this context, a "locking device" shall be understood as, in particular, a device that, in at least one operating state, is designed to stop and/or prevent a power take-off unit and/or a rotation of the power take-off unit. At this point, a "power take-off unit" shall be understood as, in particular, a unit having at least one output shaft, which, in at least one operating state of the hand-held machine tool device, may be driven by an electric motor and rotationally drives a tool, in particular, for screwing, boring, milling and/or chiseling. At this point, a "rotational bearing device" represents a device, which is designed to rotationally support a component, and in particular, a component of the power take-off unit or the output shaft, and/or in which, in the case of an angular motion of the component to be supported, a relative movement of the component with respect to the rotational bearing device occurs. Furthermore, "designed" shall be understood as specially equipped and/or designed. In this context, "in one piece" shall be understood to mean, in particular, that the locking device may only be separated from the rotational bearing device with loss of function, and/or that at least a part of the locking device and a part of the rotational bearing device are formed by the same component. In this instance, in operation, a bearing force of the component rotationally supported by the rotational bearing device is preferably supported radially outwardly by at least one component of the locking device. In this connection, the expression "at least part of" means that at least one component, for example, a clamping device, of the locking device is formed in one piece with the rotational bearing device. The one-piece construction may advantageously allow the hand-held machine tool device, i.e., the locking device and the rotational bearing device, to be produced in a manner that reduces component parts, costs and assembly expenditure and saves space. The rotational bearing device and the locking device are advantageously situated in a common plane running perpendicular to an axis of rotation of the rotational bearing device. In this manner, an overall length of the hand-held machine tool may be advantageously reduced.

In order to advantageously support the component to be supported by the rotational bearing device, the hand-held machine tool device has, along a bearing-force force flux of the component to be supported of the rotational bearing device and the locking device, a radial clearance advantageously less than 0.1 mm and particularly advantageously less than 0.05 mm. A clamping device of the locking device, which clamping device forms a part of the rotational bearing device and forms, in particular, a bearing surface, and/or a component onto which a bearing force of the rotational bearing device is transmitted directly or indirectly by the clamping device, have, particularly preferably, a radial tolerance less than 0.1 mm and, particularly preferably, less than 0.05 mm.

Furthermore, it is provided that the locking device have a clamping device, which forms a bearing surface of the rotational bearing device and, in particular, is formed by a clamping ring. In this context, a "clamping device" shall be understood as a device, which, in an operating state of a locking of the power take-off unit, participates in setting and/or retaining a locking procedure. In this connection, participation of the clamping device or the clamping ring may take place actively, i.e., via a movement of the clamping device using a movably driven element such as the output shaft, and/or passively, i.e., via a motionless stationary mount of the clamping device. At this point, a "bearing surface" shall be understood as, in particular, a surface or upper surface of a component, i.e., of a clamping device, at or on which a further element of the rotational bearing device moves and/or rolls in response to a rotary motion of the power take-off unit, and/or which moves on the further element in response to the rotary motion. Producing the bearing surface may allow particularly advantageous and low-friction motion of the power take-off unit to be provided.

In addition, it is advantageous for the clamping ring to have a bearing surface for direct support in a gear housing. In this connection, a "bearing surface" shall be understood as, in particular, a surface which supports bearing forces of the power take-off unit or the output shaft at a gear housing, a "gear housing" representing a housing, which is separate from a machine housing and surrounds a gear unit or the hand-held machine tool device in at least a circumferential direction. A "direct support" shall be understood to mean that at least 50%, preferably at least 75%, and especially 100% of an outer circumference of the clamping ring is in direct contact with the gear housing in the form of force-locked and/or friction-locked contact. The design of the present invention may allow bearing forces to be supported in a structurally simple and effective manner.

In a further embodiment of the present invention, it is proposed that the clamping ring form a radially internal bearing surface, a "radially internal bearing surface" being described as, in particular, a surface that is oriented towards a center point of the power take-off unit. The clamping device is preferably formed by the clamping ring, which provides the direct support at the gear housing and represents a component that is immobile, i.e., stationary with respect to the power take-off unit. In addition, a further element of the rotational bearing device is moved on the bearing surface. Furthermore, the inner bearing surface is intended to reduce, in at least one operating state, a space requirement of a component to be clamped. The inner bearing surface may allow structurally simple movement and support.

In addition, it is proposed that the clamping device form a radially external bearing surface, a "radially external bearing surface" being understood to mean that the bearing surface is situated so as to point away from the center point of the power take-off unit. The clamping device is preferably formed by a clamping ring and/or by an essentially annular and/or triangular disk, which is a component of the power take-off unit and may be moved while rotationally fixed to the output shaft. The radially external bearing surface may allow a particularly simple and quiet interaction with the radially internal bearing surface.

Furthermore, it may be advantageous for the locking device to have at least one locking rolling element, which forms a rolling contact bearing element of the rotational bearing device. In this context, a "locking rolling element" shall be understood as, in particular, a rolling element that, in the locking procedure of the power take-off unit, is driven by a rolling movement and/or brought, via this movement, into a position that locks the power take-off unit or prevents a movement of the power take-off unit. At this juncture, a "rolling element" shall be understood as a body that appears useful to one skilled in the art, for example, a sphere, a roller, a barrel, a needle, a cone and/or, in particular, a cylinder, which may execute a rolling movement. In this context, a "rolling contact bearing element" represents, in particular, a device that has a characteristic, such as a shape, for both executing a rolling movement and performing a support function. This dual function may advantageously allow component parts, costs, assembly expenditure and space to be saved.

Particularly reliable support may be advantageously attained, when the rotational bearing device has at least a rolling contact bearing element differing from a locking rolling element. At this point, a "rolling contact bearing element" shall be understood as, in particular, a device such as a rolling element that is a component of a rolling contact bearing, a rolling contact bearing representing, in particular, a bearing in which two components movable relative to each other, such as the clamping ring and the output shaft, are positioned so as to be separated by rotationally movable bodies. In this context, a "rolling contact bearing element differing from a locking rolling element" shall be understood to mean, in particular, that the rolling contact bearing element takes the form of a separate and independent component with respect to a locking rolling element. The separate construction may allow each component, i.e., the locking rolling element and the rolling contact bearing element, to be designed and/or manufactured for its special function in a structurally simple manner. In addition, the provision of a rolling contact bearing may allow a bearing to be manufactured that may be operated with less rolling friction.

Furthermore, it is provided that the rotational bearing device have at least one sliding bearing element. In this context, a "sliding bearing element" shall be understood as, in particular, a device having at least a sliding support function, a "sliding support function" meaning that the sliding bearing element has direct contact with its bearing partner. The sliding bearing element preferably represents a clamping device and/or a clamping ring and forms a sliding bearing together with a further sliding bearing element such as a part of the power take-off unit or the output shaft. The use of the sliding bearing element and, therefore, the sliding bearing may allow, first of all, a structurally simple and reliable bearing to be provided and, secondly, assembly expenditure, costs and component parts to be saved.

In addition, it is proposed that the hand-held machine tool device have a planetary gear unit, which may advantageously allow a robust and space-saving gear unit construction to be provided.

In addition, it is provided that a planet carrier of the planetary gear unit have at least one positioning element for positioning at least one locking rolling element in its release position. In this context, a "positioning element" shall be understood as, in particular, a device that is designed to secure and/or fix a position and/or a posture of a locking rolling element and/or the locking rolling elements in a circumferential direction. "A release position of the locking rolling element" shall be understood as, in particular, the position, in which the locking rolling element releases a rotary drive, in particular, the output shaft. In addition, the positioning element may also be used for positioning the rolling contact bearing element. The positioning element preferably takes the form of a protuberance pointing towards the tool in an axial direction. The implementation of the positioning element may assure reliable transmission of a torque.

In addition, robust power transmission may be realized when the planet carrier has at least one driving mechanism for transmitting the torque. In this context, a "driving mechanism" shall be understood as, in particular, a means such as a recess, an extension or another means considered useful by one skilled in the art, which may transmit a rotational drive input of a drive motor via the planetary gear unit to the power take-off unit, and therefore, to the tool.

The rotational bearing device advantageously has a sliding bearing sleeve directly coupled to a shaft of the power take-off unit. At this point, a "sliding bearing sleeve" shall be understood as, in particular, a sleeve made of bronze. However, in principle, the use of a sleeve based on a different principle considered practical by one skilled in the art for a self-lubricating bearing would be conceivable. A "direct coupling" shall be understood as, in particular, a coupling that functions without interposed component parts. The sliding bearing sleeve may allow a bearing to be produced that economizes on component parts.

In addition, it is advantageous when the sliding bearing sleeve has at least one receiving element for receiving at least a locking rolling element, which means that the locking device may be fit into the rotational bearing device in a structurally simple manner.

In a further refinement of the present invention, a hand-held machine tool having a hand-held machine tool device is also provided. In this connection, the hand-held machine tool device of the present invention is suited, in particular, for hand-held machine tools for boring, screwing and/or hammering. However, a use with other hand-held machine tools considered practical by one skilled in the art is conceivable as well.

BRIEF DESCRIPTION OF THE DRAWINGS

Further advantages are derived from the description of the figures that follows. The drawing shows exemplary embodiments of the present invention. The drawing, the description, and the claims include numerous features in combination. One skilled in the art will necessarily consider the features individually as well and combine them into further useful combinations.

FIG. 11 shows a sectional view of a sixth alternative embodiment of the hand-held machine tool device.

FIG. 12 shows a sectional view of a seventh alternative embodiment of the hand-held machine tool device.

FIG. 13 shows a sectional view of an eighth alternative embodiment of the hand-held machine tool device.

DETAILED DESCRIPTION OF THE INVENTION

Figure 1:
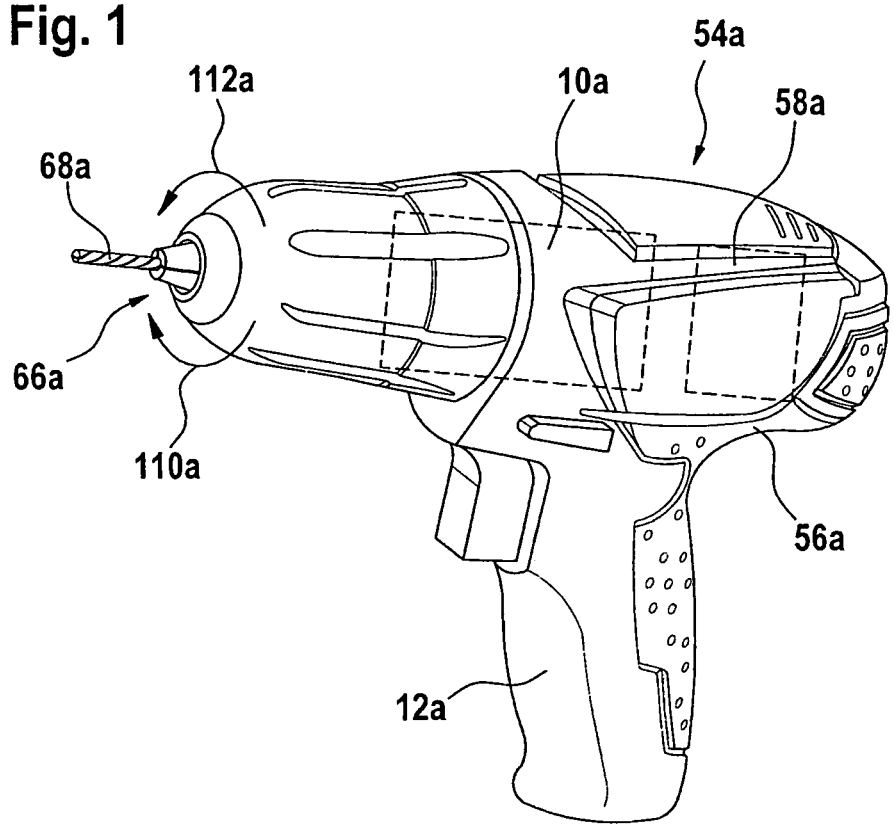
FIG. 1 shows a hand-held machine tool having a hand-held machine tool device according to the present invention.

FIG. 1 shows a schematically represented hand-held machine tool 54a in the form of a screwdriver 12a, having a drive motor 58a, which is situated in a motor housing 56a, and by which a planetary gear unit 40a situated on an output shaft 60a of power take-off unit 16a is rotationally drivable via a drive shaft not shown in detail and a drill chuck 62a in the form of a quick-action drill chuck is rotationally drivable via the output shaft 60a. Drill chuck 62a is connected to output shaft 60a via a threaded connection 64a and has a clamping device 66a for attaching a tool 68a, which is operable in the rotational direction of output shaft 60a (FIGS. 1 and 2).

In addition, hand-held machine tool 54a has a hand-held machine tool device 10a having a locking device 14a, which is configured for locking power take-off unit 16a, and via which output shaft 60a is connectible with respect to motor housing 56a in a rotatably fixed manner for releasing and locking clamping device 66a. This locking device 14a is automatically opened in response to transmission of torque from drive motor 58a to drill chuck 62a and automatically locked in response to transmission of torque from drill chuck 62a to drive motor 58a.

Figure 2:
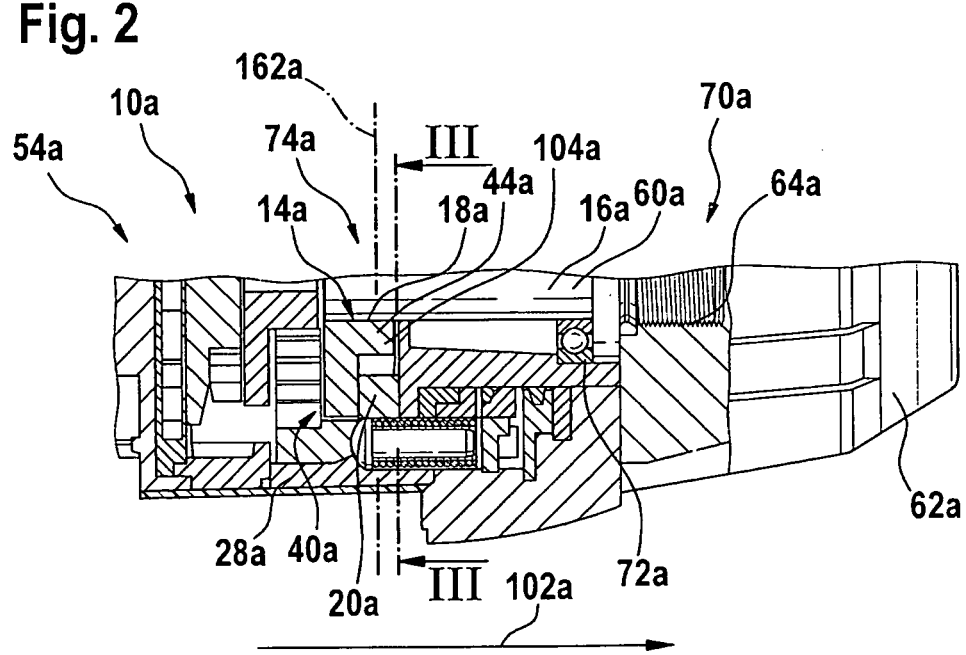
FIG. 2 shows a section through a gear housing of the hand-held machine tool according to FIG. 1.

As can be seen in FIG. 2, which shows a sectional view of a gear housing 28a of hand-held machine tool 54a, output shaft 60a is supportingly held in a bearing 72a in an end region 70a of output shaft 60a facing drill chuck 62a. However, end region 74a of output shaft 60a facing away from drill chuck 62a is supported by locking device 14a, which therefore forms a part of a rotational bearing device 18a of power take-off unit 16a, which means that at least part of locking device 14a and rotational bearing device 18a is formed in one piece. Therefore, rotational bearing device 18a represents the only support means in end region 74a of power take-off unit 16a.

Figure 3:
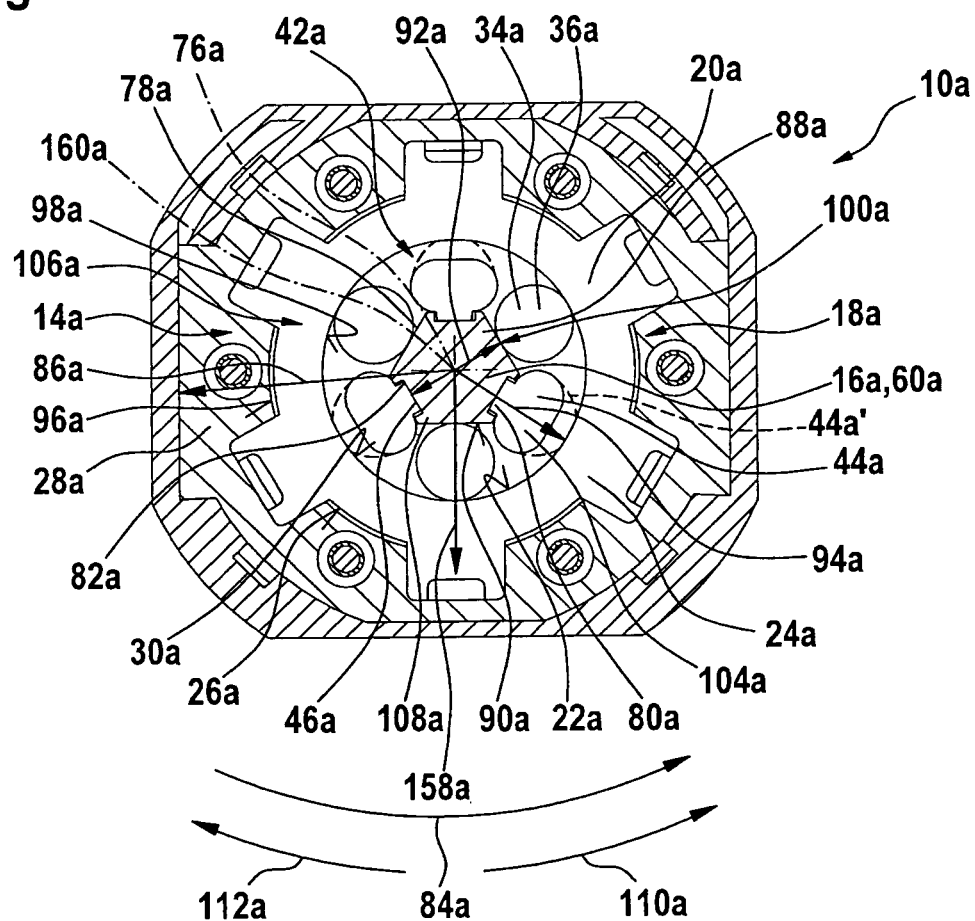
FIG. 3 shows a section through the hand-held machine tool device according to FIG. 2.

In FIG. 3, locking device 14a, i.e., rotational bearing device 18a, is represented in detail as a sectional view along line of FIG. 2. A rotatably supported planet carrier 42a of planetary gear unit 40a, via which output shaft 60a is drivable by drive motor 58a, is situated on output shaft 60a as a component of locking device 14a. To transmit the torque, planet carrier 42a has three driving mechanisms 46a, which point radially with respect to a center point 76a of output shaft 60a and are arranged uniformly about a circumference 78a of output shaft 60a in the form of extensions 80a, which mate, with play in a circumferential direction 84a, with respective recesses 82a of output shaft 60a that point towards center point 76a and are distributed over circumference 78a (see also FIG. 7).

In addition, for transmitting torque, locking device 14a has three extensions 88a formed onto output shaft 60a and pointing away from center point 76a in radial direction 86a. Extensions 88a terminate in a planar surface 90a, which extends perpendicular to a diameter 92a of output shaft 60a.

In addition, locking device 14a has a clamping device 20a, which is formed by an outer clamping ring 24a that is disposed around output shaft 60a at a uniform radial distance 94a from center point 76a. Furthermore, outer clamping ring 24a has a bearing surface 26a for direct support in gear housing 28a. Bearing surface 26a is formed by an outer circumferential surface 96a of outer clamping ring 24a, which is supported at gear housing 28a in a rotatably fixed, form-locked and force-locked manner.

Three locking rolling elements 34a are each radially disposed in radial space 94a, between one of surfaces 90a and an inner surface 98a of outer clamping ring 24a. To position locking rolling elements 34a in a middle region 100a of surface 90a, i.e., in its release position, planet carrier 42a has three positioning elements 44a. Positioning elements 44a are formed by protuberances 104a pointing in axial direction 102a (see FIG. 2), of which each is disposed between two locking rolling elements 34a in circumferential direction 84a.

In addition, clamping device 20a, i.e., outer clamping ring 24a, forms a bearing surface 22a, and in particular, a radially internal bearing surface 30a, of rotational bearing device 18a. In an operating state of torque transmission from drive motor 58a to output shaft 60a, locking rolling elements 34a run or roll on this bearing surface 30a. Radially internal bearing surface 30a and surface 90a of output shaft 60a are ground to size. A consequently possible, accurately fit bearing seat of locking rolling element 34 in radial space 94a between surface 90a and clamping ring 24a allows locking rolling elements 34a to form rolling contact bearing elements 36a of rotational bearing device 18a. A rolling contact bearing 106a, via which output shaft 60a is rotationally mounted, forms a force-locked connection between locking rolling elements 34a, clamping ring 24a and gear housing 28a. Clamping device 20a, i.e., clamping ring 24a, is fixedly supported in gear housing 28a, that is, without radial play, and indeed, clamping ring 24a is clamped in gear housing 28a in radial direction 86a. However, it could be secured in gear housing 28a using a different manner of fastening considered practical by one skilled in the art, for instance, using, in particular, a screw connection. The hand-held machine tool device has a radial play less than 0.05 mm in a force-flux direction of a bearing force 158a of the output shaft 60a supported by rotational bearing device 18a (FIG. 3). Rotational bearing device 18a for supporting output shaft 60a, as well as locking device 14a, i.e., clamping ring 20a of locking device 14a, are disposed in a common plane 162a running perpendicular to an axis of rotation 160a of output shaft 60a (FIGS. 2 and 3). Alternatively and/or in addition to supporting bearing forces of output shaft 60a via locking rolling elements 34a, bearing forces of output shaft 60a could also be supported by positioning elements 44a', by extending them in radial direction 86a up to bearing surface 22a, as schematically indicated in FIG. 3.

If drive motor 58a drives planet carrier 42a via the drive shaft, then the torque is transmitted by planet carrier 42a through driving mechanisms 46a, i.e., extensions 80a, and recesses 82a to output shaft 60a and, consequently, to drill chuck 62a. Output shaft 60a is reliably supported and driven, in that locking rolling elements 34a, i.e., rolling contact bearing elements 36a, are retained in their release position in middle region 100a of surfaces 90a by positioning elements 44a. Locking rolling elements 34a are prevented from locking, and locking device 14a is opened.

If, in the event of a switched-off drive motor 58a, a torque is transmitted by drill chuck 62a via output shaft 60a to extensions 80a of planet carrier 42a, this has the effect of transmitting torque to positioning elements 44a. Due to their moment of inertia, locking rolling elements 34a are pressed into an edge region 108a of surface 90a, which has a smaller radial clearance 94a than middle region 100a of surface 90a, and become jammed between surface 90a and clamping ring 24a (not shown). Output shaft 60a is supported in gear housing 28a in a rotatably fixed manner via surfaces 90a, locking rolling elements 34a, and via clamping ring 24a. Output shaft 60a is automatically locked to the housing. Tools 68a may be tightened and loosened in drill chuck 62a, and/or drill chuck 62a may screwed onto output shaft 60a or unscrewed from output shaft 60a without having to apply, by hand, a counter-torque at the drill chuck.

Locking device 14a is constructed to be symmetric so that from drive motor 58a, a torque may be transmitted in both directions of rotation 110a, 112a through locking device 14a to output shaft 60a and drill chuck 62a. Locking device 14a opens automatically in both directions of rotation 110a, 112a. In addition, when drive motor 58a is switched off, locking device 14a locks in both directions of rotation 110a, 112a if a torque from drill chuck 62a is transmitted to planet carrier 42a via output shaft 60a.

Alternative exemplary embodiments of machine tool device 10a are shown in FIGS. 4 through 13. Essentially unchanged components, features and functions are basically denoted by the same reference numerals. However, to differentiate between the exemplary embodiments, letters a through h are added to the reference numerals. The following description is essentially limited to differences from the exemplary embodiment in FIGS. 1 through 3; regarding unchanged component parts, features and functions, reference can be made to the description of the exemplary embodiment in FIGS. 1 through 3.

Figure 4:
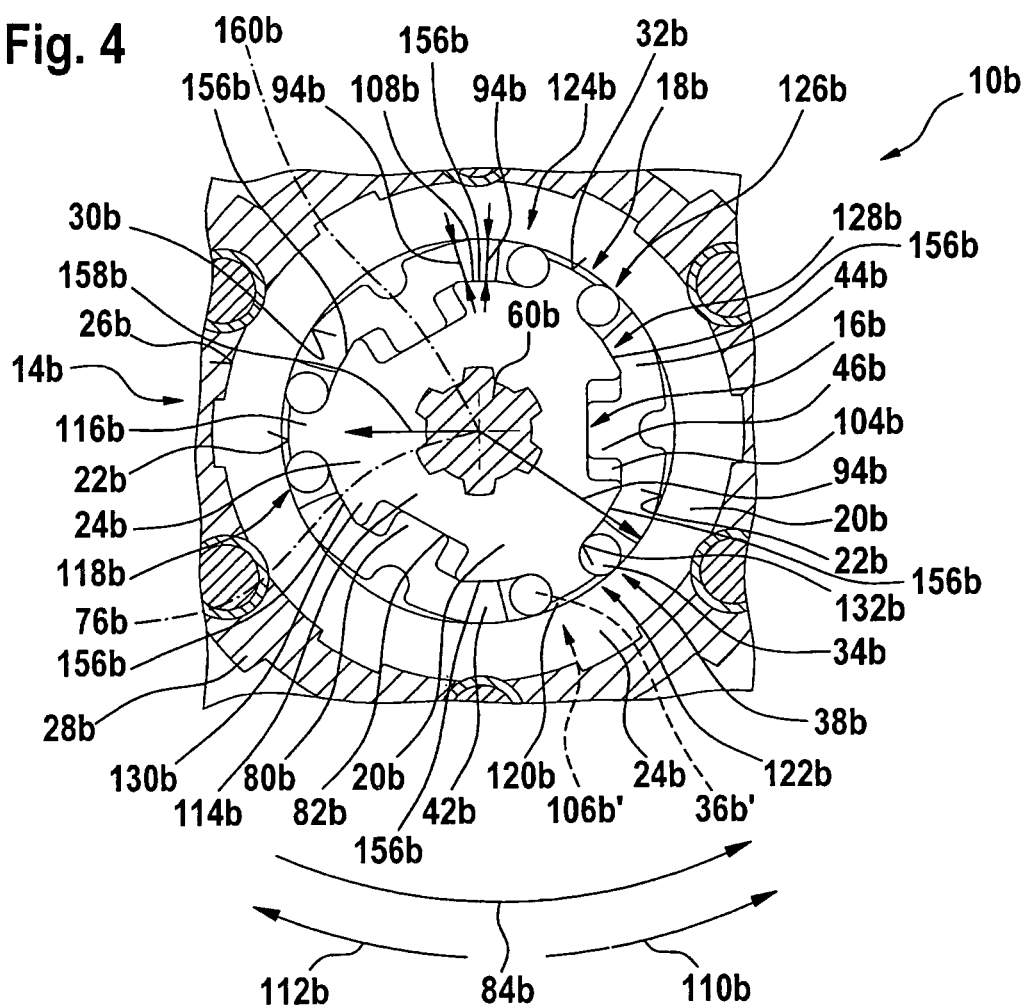
FIG. 4 shows a sectional view of an alternative hand-held machine tool device.

FIG. 4 shows an alternative embodiment of the hand-held machine tool device. In addition to a rotational bearing device 18a formed in one piece with a locking device 14b, the section through a hand-held machine tool device 10b displayed here shows a power take-off unit 16b, which has an output shaft 60b and a clamping device 20b retained on output shaft 60b in a form-locked manner. Clamping device 20b is formed by an inner clamping ring 24b, i.e., by a triangular disk 114b. Clamping device 20b or radial extensions 116b at corners 118b of the triangular shape of disk 114b each form a bearing surface 22b of rotational bearing device 18b, i.e., a radially external bearing surface 32b. In an operating state of the torque transmission from a drive motor not shown to output shaft 60b, radially external bearing surface 32b runs on a radially internal bearing surface 30b, which is formed by a further clamping device in the form of an outer clamping ring 24b that is disposed about a center point 76b of output shaft 60b at a radial distance 94b. Radially external clamping ring 24b is positioned about output shaft 60b and disk 114b in such a manner, that a radial gap 120b of less than 0.1 mm is formed between bearing surface 30b and bearing surface 32b, which means that rotational bearing device 18b has a sliding bearing element 38b of a sliding bearing 122b.

In this case, a torque of the drive motor is also transmitted through driving mechanisms 46b in the form of extensions 80b of a planet carrier 42b, which point radially towards center point 76b and mate with recesses 82b of power take-off unit 16b, i.e., of disk 114b. In addition, locking rolling elements 34b are positioned by positioning elements 44b that are formed on planet carrier 42b and point in an axial direction towards a drill chuck not shown here. In this connection, in a release position, a locking rolling element 34b is situated on both sides 124b, 126b of extensions 116b. On the side 128b of each locking rolling element 34b facing away from extension 116b, a protuberance 130b, which reduces a radial distance 94b between extension 116b and outer clamping ring 24b in comparison with a radial distance 94b at the release position of locking rolling element 34b, is formed onto disk 114b.

The positioning of locking rolling elements 34b on the two sides 124b, 126b of extension 116b is provided for the option of locking output shaft 60b in both directions of rotation 110b, 112b. If a torque is transmitted from output shaft 60b to planet carrier 42b, each locking rolling element 34b situated opposite to the direction of the torque is pushed from its release position into an edge region 108b of protuberance 130b due to its moment of inertia, and since a ramp 156b of edge region 108b has a smaller radial clearance 94b than the release position, the rolling elements become jammed between protuberance 130b and clamping ring 24a, which means that a rotation of output shaft 60b is prevented (not shown).

Alternatively, locking rolling elements 34b of this exemplary embodiment may act as rolling contact bearing elements 36b', in which case radial gap 120b and sliding bearing 122b are inapplicable and a rolling contact bearing 106b' is formed. In this connection, for low-tolerance support of locking rolling elements 34b or rolling contact bearing elements 36b', radially external bearing surface 32b of inner clamping ring 24b or disk 114b and radially internal bearing surface 30b of outer clamping ring 24b, as well as free position surfaces 132b of disk 114b, which are provided for assuming the release position of locking rolling elements 34b, must be ground to size.

Figure 5:
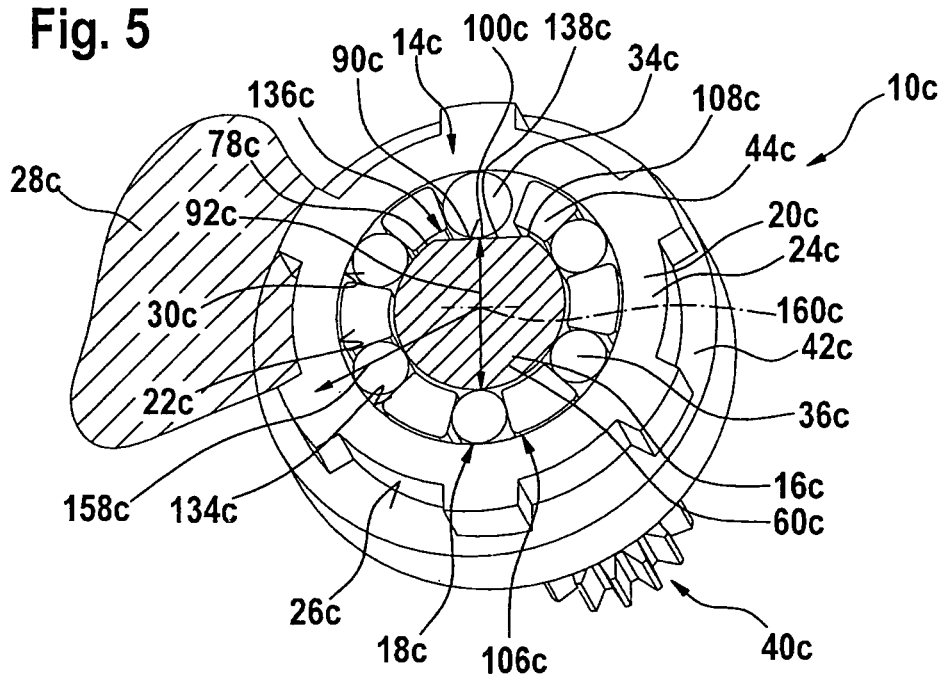
FIG. 5 shows a sectional view of a third embodiment of the hand-held machine tool device.

FIG. 5 shows a third preferred embodiment of the hand-held machine tool device. Also in the case of the hand-held machine tool device 10c shown here, at least part of a locking device 14c and a rotational bearing device 18c are constructed in one piece, since locking device 14c has a clamping device 20c in the form of a clamping ring 24c, which has a bearing surface 22c and, in particular, a radially internal bearing surface 30c of rotational bearing device 18c and is used for direct support, via a bearing surface 26c, in a gear housing 28c only shown here schematically. Therefore, clamping ring 24c forms a part of a rolling contact bearing 106c. In addition, rolling contact bearing 106c or rotational bearing device 18c has a plurality of, i.e., five, rolling contact bearing elements 36c differing from a locking rolling element 34c. The five rolling contact bearing elements 36c and locking rolling element 34c are uniformly spaced apart around a power take-off unit 16c in a circumferential direction 84c by six positioning elements 44c. For low-tolerance positioning of the bearing components, in addition to radially internal bearing surface 30c of clamping ring 24c, inner bearing surfaces 134c of rolling contact bearing elements 36c are ground to size.

Figure 6:
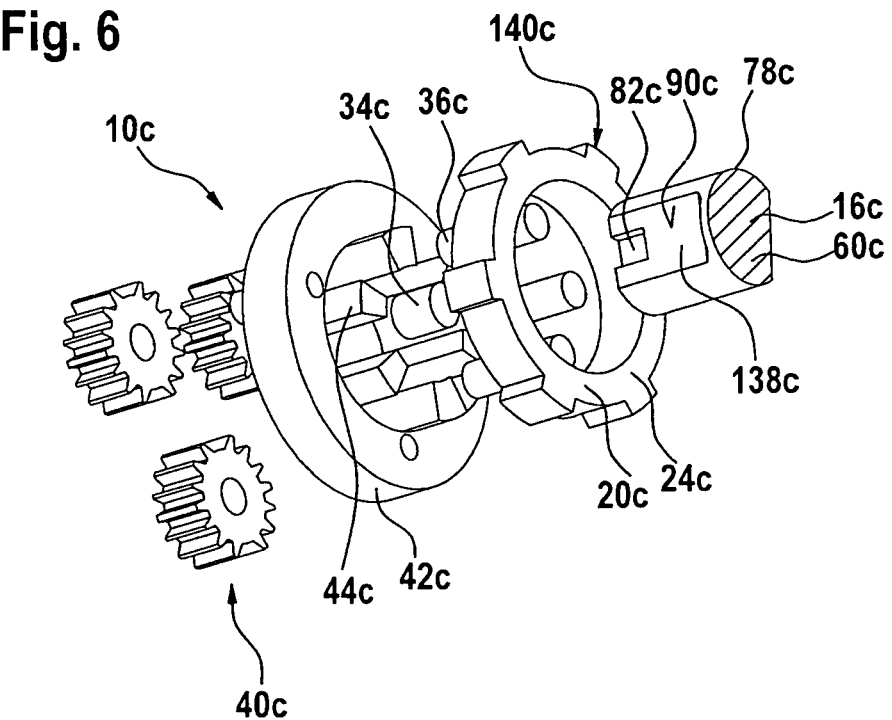
FIG. 6 shows an exploded view of the hand-held machine tool device of FIG. 5.

As can be seen in FIG. 6, which shows an exploded view of hand-held machine tool device 10c, output shaft 60c has, at a region 136c of its circumference 78c, a flattened region 138c forming a planar surface 90c, which extends perpendicularly to a diameter 92c of output shaft 60c. In a middle region 100c of surface 90c, locking rolling element 34c is held in its release position by two positioning elements 44c situated on both sides of locking rolling element 34c in circumferential direction 84c.

In addition, for straight-forward assembly of the component parts with respect to locking rolling element 34c, rolling contact bearing elements 36c have a greater length than locking rolling element 34c. To axially limit locking rolling element 34c and rolling contact bearing elements 36c, a limit stop not shown here in further detail is positioned on a side 140c of clamping ring 24c pointing away from a planet carrier 42c.

Figure 7:
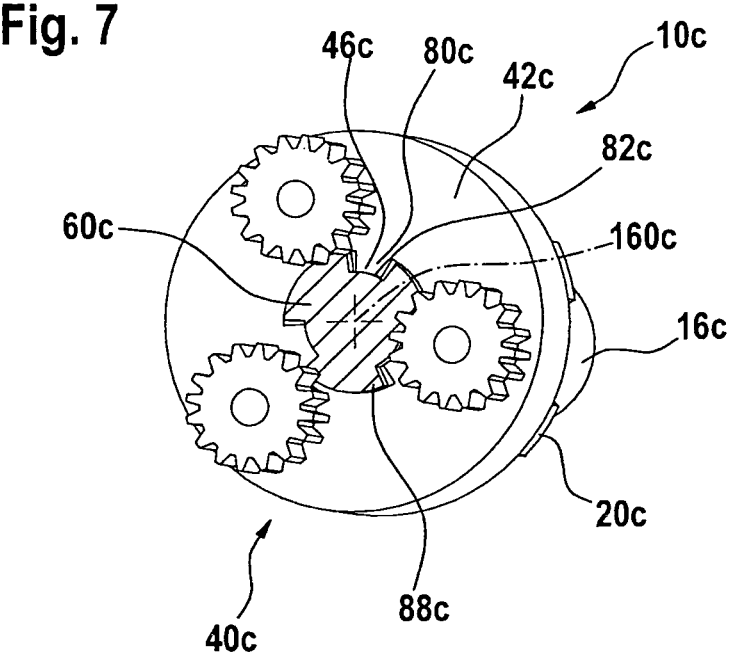
FIG. 7 shows a top view of a part of a planetary gear unit of the hand-held machine tool device of FIG. 5.

As can be seen in FIGS. 6 and 7, the torque is transmitted in a manner analogous to the sequence described in FIGS. 2 and 3, using drive mechanisms 46c, i.e., extensions 80c of planet carrier 42c, that mate with recesses 82c of output shaft 60c. In addition, a locking procedure is implemented as described for exemplary embodiment a, by locking locking rolling element 34c between an edge region 108c of surface 90c and clamping ring 24c.

Figure 8:
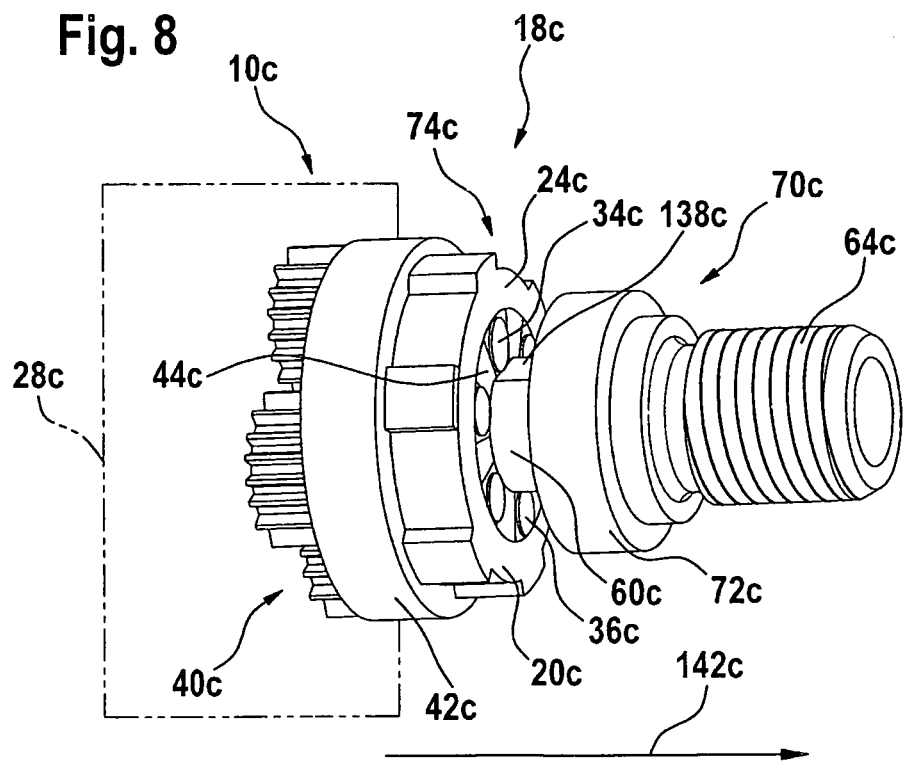
FIG. 8 shows the hand-held machine tool device of FIG. 5 in an assembled state.

FIG. 8 shows hand-held machine tool device 10c in an assembled state, situated in a gear housing 28c represented schematically and opened up; in the working mode of the drive motor not shown here, planet carrier 42c of a planetary gear unit 40c being situated along a transmission direction 142c of the torque, followed by the rotational bearing device 18c situated in an end region 70c of output shaft 60c, having clamping ring 24c and a locking rolling element 34c situated therein, as well as positioning elements 44c and rolling contact bearing elements 36c situated therein. After that, output shaft 60c extends to a bearing 72c, which is situated in an end region 74c, and to which a threaded connection 64c to a coupling of a drill chuck not shown here is connected. However, in general, it would also be possible to couple another alternative tool mount.

Figure 9:
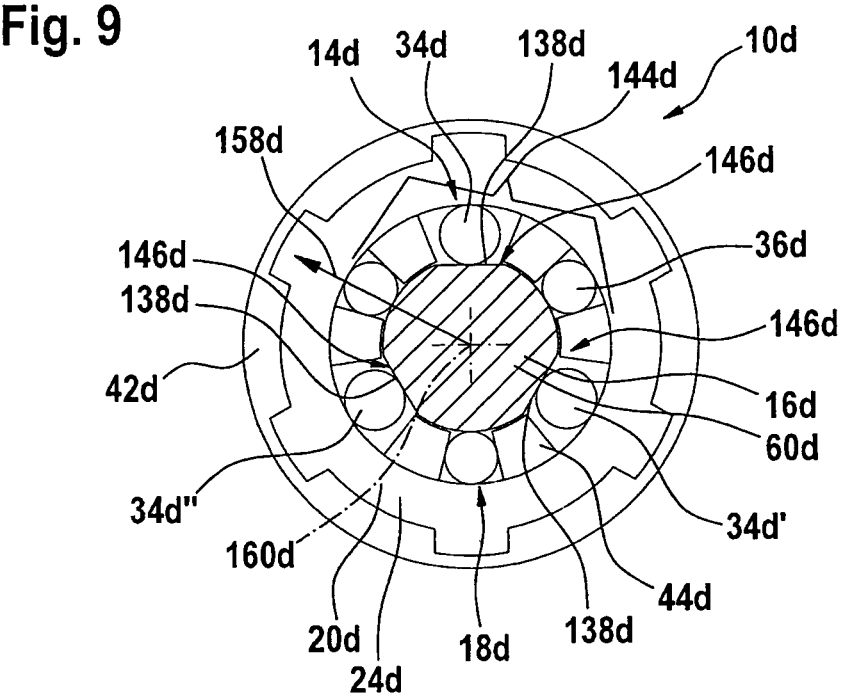
FIG. 9 shows a sectional view of a fourth alternative embodiment of the hand-held machine tool device.

A further alternative embodiment is shown in FIG. 9. In comparison with the configuration of the exemplary embodiment of FIGS. 5 to 8, this hand-held machine tool device 10d has a modified configuration of rolling contact bearing elements 36d and locking rolling elements 34d about an output shaft 60d of a power take-off unit 16d. Two positions of rolling contact bearing elements 36c according to exemplary embodiment c are replaced by two additional locking rolling elements 34d', 34d''. Consequently, a sequence of three groups 144d is produced in circumferential direction 84d, each including a positioning element 44d, a locking rolling element 34d, a further positioning element 44d and finally a rolling contact bearing element 36d. Thus, output shaft 60d also has three flattened regions 138d in three regions 146d for positioning locking rolling elements 34d in their release position. The functions of a locking device 14d and a rotational bearing device 18d are implemented in the manner of the exemplary embodiments a and c described previously.

Figure 10:
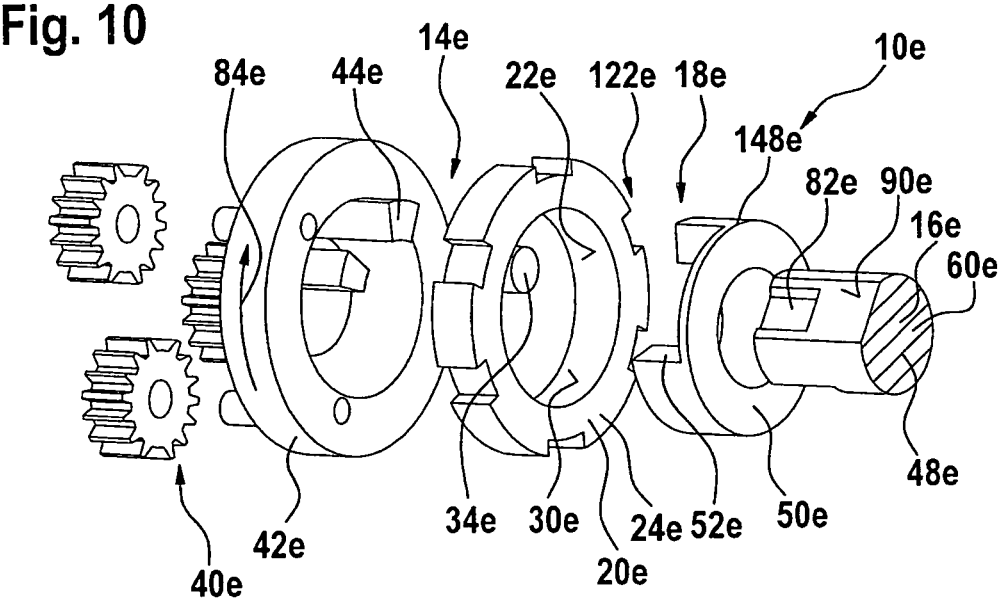
FIG. 10 shows an exploded view of a fifth variant of the hand-held machine tool device.

FIG. 10 shows a further alternative embodiment of the hand-held machine tool device. In this hand-held machine tool device 10e, the rolling contact bearing elements 36a, 36c, 36d forming a rolling contact bearing 106a, 106c, 106d in exemplary embodiments a, c and d are replaced, in that a rotational bearing device 18e has a sliding bearing sleeve 50e directly coupled to a shaft 48e of a power take-off unit 16e.

In a region of its circumference 148e, sliding bearing sleeve 50e has a receiving element 52e for receiving a locking rolling element 34e, and in circumferential direction 84e, sliding bearing sleeve 50e has positioning elements 44e adjacent to both sides of locking rolling element 34e. Sliding bearing sleeve 50e is made of bronze, in order to form a sliding bearing 122e with a bearing surface 22a, i.e., a radially internal bearing surface 30e, of a clamping device 20e of a locking device 14e, implemented as a clamping ring 24e. For the functions of locking locking rolling element 34e in a radial space between bearing surface 30e and a surface 90e of output shaft 60e, reference is made to the mechanisms described in the preceding exemplary embodiments a through d.

A further alternative hand-held machine tool device 10f is shown in FIG. 11 in a schematic sectional view. A set-up of locking rolling elements 34f, rolling contact bearing elements 36f and positioning elements 44f corresponds to the set-up in groups 144f about a circumference 78f of an output shaft 60f of a power take-off unit 16f, shown in FIG. 9 with regard to exemplary embodiment d. In addition, output shaft 60f has six radial extensions 150f, which are distributed over circumference 78f of output shaft 60f, and of which each is situated on a side 152f, 154f of one of the rolling contact bearing elements 36f, which means that, in a circumferential direction 84, rolling contact bearing element 36f is secured in position relative to power take-off unit 16f. In this case as well, a radially internal bearing surface 30f of a clamping device 20f of a locking device 14f in the form of a clamping ring 24f indicated here only schematically forms, with rolling contact bearing elements 36f, a rolling contact bearing 106f. Transmission of a torque is carried out by positioning elements 44f, which can each be set into rotational motion at a side of extensions 150f. Regarding the function of locking via locking rolling elements 34f in a radial space 94f between bearing surface 30f and a surface of output shaft 60f, at this point, reference is once again made to the preceding exemplary embodiments.

FIG. 12 shows a further embodiment of the hand-held machine tool device. The hand-held machine tool device 10g shown here in section differs from hand-held machine tool device 10f of FIG. 11, in that in a circumferential direction 84g, two rolling contact bearing elements 36g, which have a smaller diameter than rolling contact bearing elements 36f of FIG. 11, are situated between two radial extensions 150g of an output shaft 60f of a power take-off unit 16g. For the function of support, torque transmission and locking, reference is again made to the previously described exemplary embodiments.

Shown in FIG. 13 is a further alternative embodiment of a hand-held machine tool device 10h, which schematically represents a modification of hand-held machine tool device 10b of FIG. 4. Analogous to the exemplary embodiment of FIG. 4, a power take-off unit 16h has a disk 114h, which is supported on an output shaft 60h in a form-locked manner, and on which three extensions 116h radially distributed over circumference 78h of power take-off unit 16h are formed, a locking rolling element 34h being situated on each side 124h, 126h of the extensions. However, in contrast to exemplary embodiment b, a rotational bearing device 18h has three rolling contact bearing elements 36h differing from locking rolling elements 34h, which means that a rolling contact bearing 106h is formed to support power take-off unit 16h and output shaft 60h between a radially internal bearing surface 30h of a clamping ring 24h of a locking device 14h, only indicated here schematically. Transmission of a torque is carried out by positioning elements 44h, which are each positioned between a locking rolling element 34h and a rolling contact bearing element 36h in a circumferential direction 84h. For an explanation of a locking function, reference is made to the description of exemplary embodiment b of FIG. 4.

What is claimed is:

1. A hand-held machine tool device, comprising:
   a power take-off unit;
   a locking device including a clamping device for locking the power take-off unit, the locking device including at least three locking rolling element;
   a rotational bearing device of the power take-off unit; and
   a planetary gear unit having a planet carrier,
   wherein at least part of the locking device and the rotational bearing device is formed in one piece,
   wherein the clamping device forms a bearing surface of the rotational bearing device,
   wherein the clamping device is formed by a clamping ring, the clamping ring being fixedly supported in a gear housing,
   wherein the planet carrier of the planetary gear unit has at least three positioning elements for positioning the at least three locking rolling elements of the locking device in its release position, wherein the at least three positioning elements and the at least three locking rolling elements are uniformly spaced apart around the power take-off unit in a circumferential direction, and wherein a bearing force of the power take-off unit supported by the rotational bearing device is supported radially outwardly relative to a rotation axis of the power take-off unit by the clamping device of the locking device.

2. The hand-held machine tool device according to claim 1, wherein the clamping ring has a bearing surface for direct support in the gear housing.

3. The hand-held machine tool device according to claim 1, wherein the clamping device forms a radially internal bearing surface.

4. The hand-held machine tool device according to claim 1, wherein the clamping device forms a radially external bearing surface.

5. The hand-held machine tool device according to claim 1, wherein the at least one locking rolling element forms a rolling contact bearing element of the rotational bearing device.

6. The hand-held machine tool device according to claim 1, wherein the rotational bearing device has at least one rolling contact bearing element differing from the locking rolling element.

7. The hand-held machine tool device according to claim 1, wherein the rotational bearing device has at least one sliding bearing element.

8. The hand-held machine tool device according to claim 1, wherein the planet carrier of the planetary gear unit has at least one driving mechanism for transmitting a torque.

9. The hand-held machine tool device according to claim 1, wherein the rotational bearing device has a sliding bearing sleeve directly coupled to a shaft of the power take-off unit.

10. The hand-held machine tool device according to at least claim 9, wherein the sliding bearing sleeve has at least one receiving element for receiving the at least one locking rolling element.

11. A hand-held machine tool having a hand-held machine tool device according to claim 1.

12. The hand-held machine tool device according to claim 1, wherein the power take-off unit has at least one output shaft.

13. The hand-held machine tool device according to claim 1, wherein the power take-off unit is embodied as an output shaft.

14. The hand-held machine tool device according to claim 1, wherein the power take-off unit has an output shaft and a clamping device that is retained on the output shaft.

* * * * *